US008819777B2

(12) United States Patent
Mackler

(10) Patent No.: US 8,819,777 B2
(45) Date of Patent: Aug. 26, 2014

(54) METHOD AND APPARATUS FOR PREVENTING AND ANALYZING NETWORK INTRUSION

(75) Inventor: Russell T. Mackler, Avondale, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 523 days.

(21) Appl. No.: 12/794,080

(22) Filed: Jun. 4, 2010

(65) Prior Publication Data

US 2011/0302628 A1    Dec. 8, 2011

(51) Int. Cl.
*G06F 21/00*     (2013.01)
*H04L 29/06*    (2006.01)

(52) U.S. Cl.
CPC ........ *H04L 63/1441* (2013.01); *H04L 63/1491* (2013.01); *H04L 63/14* (2013.01)
USPC ................................................. 726/3; 726/22

(58) Field of Classification Search
CPC .. H04L 63/14; H04L 63/1441; H04L 63/1491
USPC .................................................. 726/3, 22, 23
See application file for complete search history.

(56) References Cited

U.S. PATENT DOCUMENTS

| | | |
|---|---|---|
| 6,981,155 B1 | 12/2005 | Lyle et al. |
| 7,117,532 B1 | 10/2006 | Lyle et al. |
| 7,296,274 B2 | 11/2007 | Cohen et al. |
| 7,356,844 B2 | 4/2008 | Lyle et al. |
| 7,437,766 B2 | 10/2008 | Cohen et al. |
| 7,516,227 B2 | 4/2009 | Cohen |
| 7,603,709 B2 | 10/2009 | Lewis et al. |
| 2002/0066034 A1* | 5/2002 | Schlossberg et al. ......... 713/201 |
| 2002/0071436 A1* | 6/2002 | Border et al. ............ 370/395.32 |
| 2006/0242704 A1* | 10/2006 | Aviani et al. ..................... 726/23 |
| 2007/0300300 A1* | 12/2007 | Guo et al. ........................ 726/23 |
| 2009/0013410 A1 | 1/2009 | Kaler et al. |
| 2009/0241191 A1 | 9/2009 | Keromytis et al. |

* cited by examiner

*Primary Examiner* — Peter Shaw
(74) *Attorney, Agent, or Firm* — Oblon, Spivak, McClelland, Maier & Neustadt, L.L.P.

(57) ABSTRACT

Aspects of the disclosure provide a method for preventing and analyzing network intrusion. The method includes receiving by a network device an initial communication from an entity, determining the entity is not trusted based on the initial communication, and transmitting signals to the entity that are indicative of first disinformation of the network device to hide real information of the network device.

18 Claims, 6 Drawing Sheets

METHOD AND APPARATUS FOR PREVENTING AND ANALYZING NETWORK INTRUSION

BACKGROUND

Generally, an attacker on a network starts an attack from gathering information of a target device. In an example, an attacker first uses an approach to gather software and/or hardware information about a device. Based on the gathered information, the attacker determines weakness of the device, and further determines an intrusion technique to use the weakness to gain unauthorized access to the device.

SUMMARY

Aspects of the disclosure can provide a method for preventing and analyzing network intrusion. The method includes receiving by a network device an initial communication from an entity, determining the entity is not trusted based on the initial communication, and transmitting signals to the entity that are indicative of first disinformation of the network device to hide real information of the network device.

In an embodiment, the method includes transmitting signals that are indicative of the first disinformation to hide the real information of the network device in a consistent manner within a first time window, and transmitting signals that are indicative of second disinformation to hide the real information of the network device within a second time window.

Further, in an example, the method includes receiving a control signal from a management device that manages disinformation of a sub-network that includes the network device. The control signal is indicative of the first disinformation.

To determine the entity is not trusted, the method includes determining the entity is not trusted when a trust credential of the entity does not satisfy a trust condition and/or determining the entity is not trusted when the initial communication is invalid.

In addition, the method includes recording the entity in association with the first disinformation. Further, the method includes correlating an attack to the entity when the attack targets the network device based on the first disinformation.

In an embodiment, the first disinformation includes indicating a port is open when the real status of the port is close, or indicating the port is close when the real status of the port is open.

Aspects of the disclosure can provide a network device. The network device includes a network interface module configured to receive signals from entities and transmit signals to the entities. Further, the network device includes a net liar module. The net liar module includes a trust determination module configured to determine that an entity is not trusted based on an initial communication from the entity. In addition, the net liar module includes a disinformation controller module configured to control the network interface module to transmit signals that are indicative of first disinformation to hide real information of the network device. The trust determination module can include a trust credential identification module and/or a valid communication determination module.

According to an embodiment of the disclosure, the disinformation controller module is further configured to control the network interface module to transmit signals that are indicative of the first disinformation in a consistent manner within a first time window. Further, the disinformation controller module is configured to control the network interface module to transmit signals that are indicative of second disinformation within a second time window.

In an embodiment, the disinformation controller module is configured to receive a control signal from a management module that manages disinformation of a sub-network that includes the network device. The control signal is indicative of the first disinformation to hide the real information of the network device. In an example, the network device includes the management module. In another example, another network device includes the management module, and transmits the control signal to the network device.

According to an aspect of the disclosure, the trust determination module includes a trust list listing trusted entities.

Further, the net liar module includes an information collection module configured to record the entity in association with the first disinformation fed to the entity.

In addition, the net liar module includes an attacker identification module configured to correlate an attack to the entity when the attack targets the network device based on the first disinformation.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
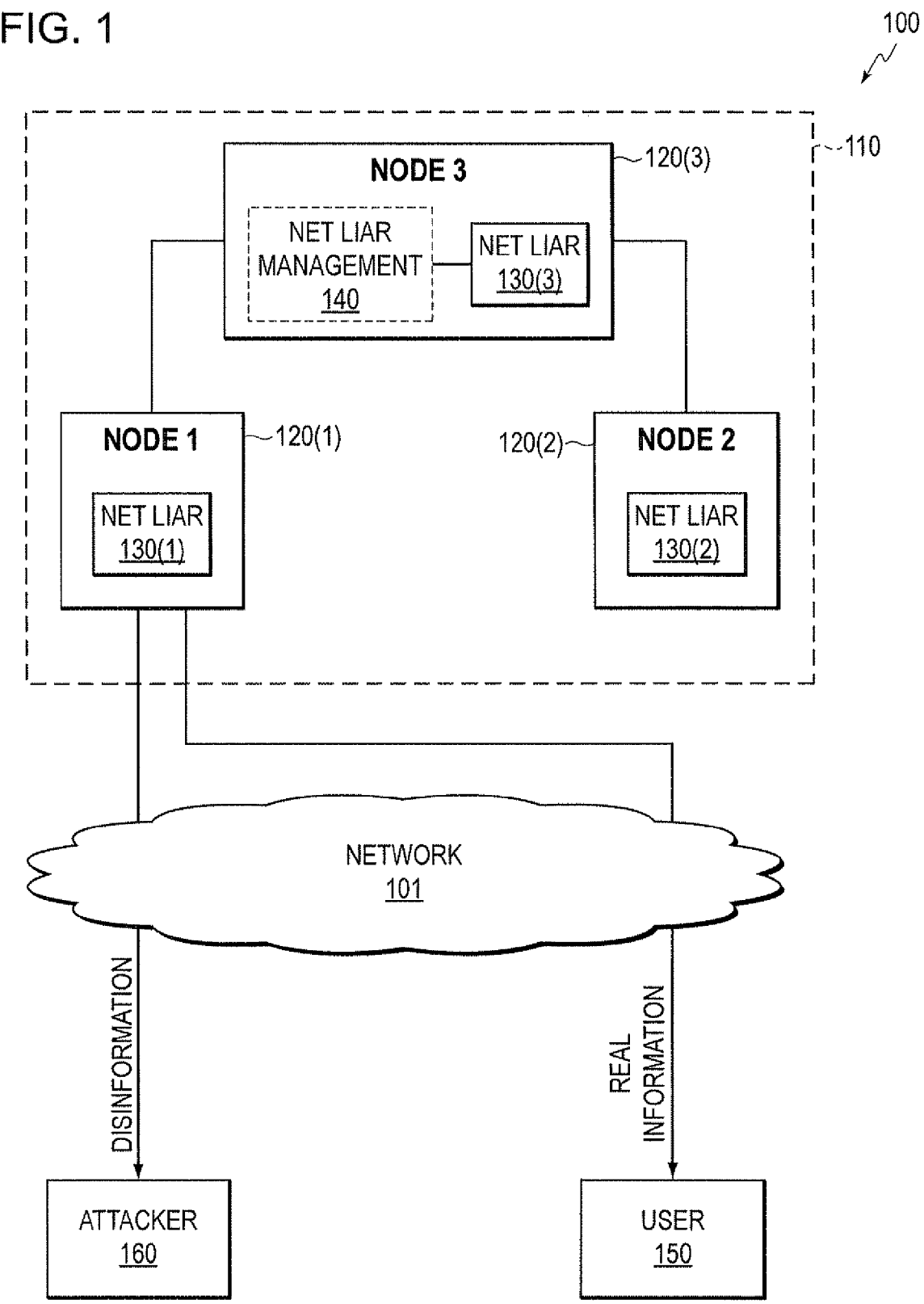
FIG. 1 shows a block diagram of a network intrusion prevention example 100 having at least one net liar enabled network node according to an embodiment of the disclosure.

FIG. 1 shows a block diagram of a network intrusion prevention example 100 having at least one net liar enabled network node according to an embodiment of the disclosure. In the FIG. 1 example, a sub-network 110 is suitably coupled to network 101, and communicates with various entities 150 and 160 via the network 101. The sub-network 110 includes a plurality of network nodes 120(1-3). At least one of the network nodes 120(1-3) is a net liar enabled node. The net liar enabled node prevents intrusions coming from network 101 by providing disinformation to entities that do not have enough trust credential, and/or a communication initialized by the entities is invalid.

Network 101 can be a single network or a plurality of networks of the same or different types. Further, network 101 includes any suitable technique that supports communication between two devices. For example, network 101 can include a local telephone network in connection with a long distance telephone network. Further, network 101 may be a data network or a telecommunications or video distribution (e.g. cable, terrestrial broadcast, or satellite) network in connection with a data network. Any combination of telecommunications, video/audio distribution and data networks, whether a global, national, regional, wide-area, local area, or in-home network, may be used without departing from the spirit and scope of the present invention. For the purposes of discussion, it will be assumed that network 101 is a single integrated data network, that is either wired and/or wireless.

The entities can include users 150 and attackers 160. In the FIG. 1 example, a user 150 of the sub-network 110 remotely accesses the sub-network 110, or a portion of the sub-network 110. The user 150 is entitled to obtain real information of the sub-network 110 in order to communicate appropriately. Further, in the FIG. 1 example, an attacker 160 tries to access the sub-network 110 for malicious purposes. For example, the attacker 160 tries to access a basic input/output system (BIOS) file of a network node to control the network node or damage the network node.

In the sub-network 110, the plurality of network nodes 120(1-3) are devices of any suitable type that allow for the transmission and/or reception of communication signals. For example, the plurality of network nodes 120(1-3) are cellular phones, computers, personal digital assistants, video telephones, and the like. Other suitable communication devices are also contemplated. The plurality of network nodes 120(1-3) include any suitable network interface module, such as a network interface card, network adaptor, and the like, that can suitably couple the network nodes 120 (1-3) together, and couple the network nodes 120(1-3) to the network 101, via any suitable link, such as a direct serial/parallel connection, cellular telephone link, RF and/or IR link, satellite communication link, fiber optical cable, and the like.

In the sub-network 110, at least one of the network nodes 120(1-3), such as NODE-1 120(1), is a net liar enabled node. NODE-1 120(1) includes a net liar module 130(1) that prevents network intrusion at a relatively early stage by using disinformation to hide real software/hardware information of NODE-1 120(1). Generally, an attacker 160 starts a network intrusion by gathering information of a target device. In an example, the attacker 160 uses an approach, such as sequential probe, Nmap port scan (either random or sequential), and the like, to scan NODE-1 120(1) to gather software/hardware information of the device at NODE-1 120(1). Based on the software/hardware information, the attacker 160 finds a weakness to attack.

The net liar module 130(1) enables NODE-1 120(I) to provide disinformation to the attacker 160 in response to the scan from the attacker 160. The disinformation includes consistent and systematic software/hardware information that does not correspond to the real device at NODE-1 120(1), and thus hides the real information of the device at NODE-1 120(1). For example, NODE-1 120(1) provides information to the attacker 160 to indicate an open status for a port when the real status for the port is close, or to indicate a close status for a port when the real status for the port is open. The disinformation purposely guides the attacker 160 to mistakenly determine weakness of the device at NODE-1 120(1). Thus, when the attacker 160 attacks NODE-1 120(1) based on the mistakenly determined weakness, the attack fails. Therefore, network intrusion from the attacker 160 is prevented at a relatively early stage when the attacker 160 gathers software/hardware information of the device at NODE-1 120(1).

In an example, when the device at NODE-1 120(1) uses a Linux operating system, the provided disinformation consistently indicates that the device uses a Windows operating system. Thus, based on the provided disinformation, the attacker 160 attacks NODE-1 120(1) based on weakness in the Windows operating system, and thus the attack fails. It is noted that while NODE-1 120(1) provides to the attacker 160 disinformation of the operating system, NODE-1 120(1) may provide real information from other aspects. For example, NODE-1 120(1) uses real IP address consistently, thus the attacker 160 does not suspect the provided disinformation.

According to an aspect of the disclosure, the net liar module 130(1) provides disinformation to entities that do not have enough trust credential, and/or a communication initialized by the entities is invalid. In an embodiment, the net liar module 130(1) first identifies a trust credential of an entity that communicates with NODE-1 120(1). Based on the identified trust credential, the net liar module 130(1) provides real information or disinformation of the NODE-1 120(1) to the entity. For example, an entity initiates a communication connection with NODE-1 120(1) via network 101, for example, using a handshake process. During the handshake process, the entity informs NODE-1 120(1) of one or more identifications, such as IP address, media access control (MAC), and the like. The net liar module 130 determines whether the entity has enough trust credential based on the identifications. In an example, the net liar module 130 includes a trust list listing trusted entities, such as authorized users. The net liar module 130 determines whether a combination of the identifications is on the trust list. When the trust list includes the combination of the identifications, the entity is an authorized user of NODE-1 120(1), and the net liar module 130 provides real software/hardware information of the device at NODE-1 120(1) to the entity to assist further communication between the authorized user and the device at NODE-1 120(1). When the trust list does not include the combination of the identifications, the entity is not an authorized user, and the net liar module 130(1) provides disinformation to the entity to hide the real software/hardware information of the device at NODE-1 120(1).

In another embodiment, the net liar module 130(1) determines whether a communication initialized by an entity is valid. Based on the determination, the net liar module 130(1) provides real information or disinformation of the NODE-1 120(1) to the entity. In an example, the net liar module 130(1) receives an initial communication, such as an initial package, indicating that an entity wants to set up a connection with NODE-1 120(1). The net liar module 130(1) checks the initial package for signs that may point to invalid communication. For example, the net liar module 130(1) checks flags that should be turned off in a normal initial package. When the net liar module 130(1) finds that a flag is abnormally turned on, the net liar module 130(1) determines that the communication is invalid, and the net liar module 130(1) provides disinformation to the entity to hide the real software/hardware information of the device at NODE-1 120(1).

Further, the net liar module 130 can change the disinformation for hiding the real software/hardware information of the device at NODE-1 120(1). For example, when the device at NODE-1 120(1) uses a Linux operating system, the net liar module 130(1) provides disinformation to be indicative of using a Windows operating system in a first year, and provides disinformation to be indicative of using a Unix operating system in a second year.

In addition, the net liar module 130(1) can associate the provided disinformation with unauthorized entities in a record for further study and analysis of intrusion patterns. For example, when the net liar module 130(1) provides to a first entity disinformation that is indicative of a Windows operating system, the net liar module 130 records the first entity in association with the Windows operating system; and when the net liar module 130(1) provides to a second entity disinformation that is indicative of a Unix operating system, the net liar module 130(1) records the second entity in association with the Unix operating system.

The record of entities in association with disinformation can be used to assist further study and analysis of intrusions, such as attacker identification, and the like. For example, when NODE-1 120(1) is attacked based on weakness in a Windows operating system, entities in association with the Windows operating system in the record are identified as suspects. When NODE-1 120(1) is attacked based on weakness in a Unix operating system, entities in association with the Unix operating system in the record are identified as suspects.

According to an embodiment of the disclosure, the sub-network 110 includes multiple net liar enabled nodes 120(1-3). In an example, the multiple net liar enabled nodes 120(1-3) respectively include net liar modules 130(1-3). Each net liar enabled node 120 independently operates as NODE-1 120(1) described above. In another example, the sub-network 110 includes a net liar management node, and the multiple net liar enabled nodes 120(1-3) can be controlled by the net liar management node. In the FIG. 1 example, NODE-3 120(3) includes a net liar management module 140 that manages disinformation in the sub-network 110.

The net liar management module 140 enables congruent disinformation over the sub-network 110. For example, the net liar management module 140 determines disinformation for the sub-network 110 as a single entity. Further, the net liar management module 140 distributes the determined disinformation for the sub-network 110 to the network nodes 120(1-3). The network nodes 120(1-3) provide the disinformation to the attacker 160 in response to scan. Thus, when the attacker 160 scans different network nodes in the sub-network 110, the attacker 160 receives consistent disinformation of the sub-network 110 from the different network nodes.

Figure 2:
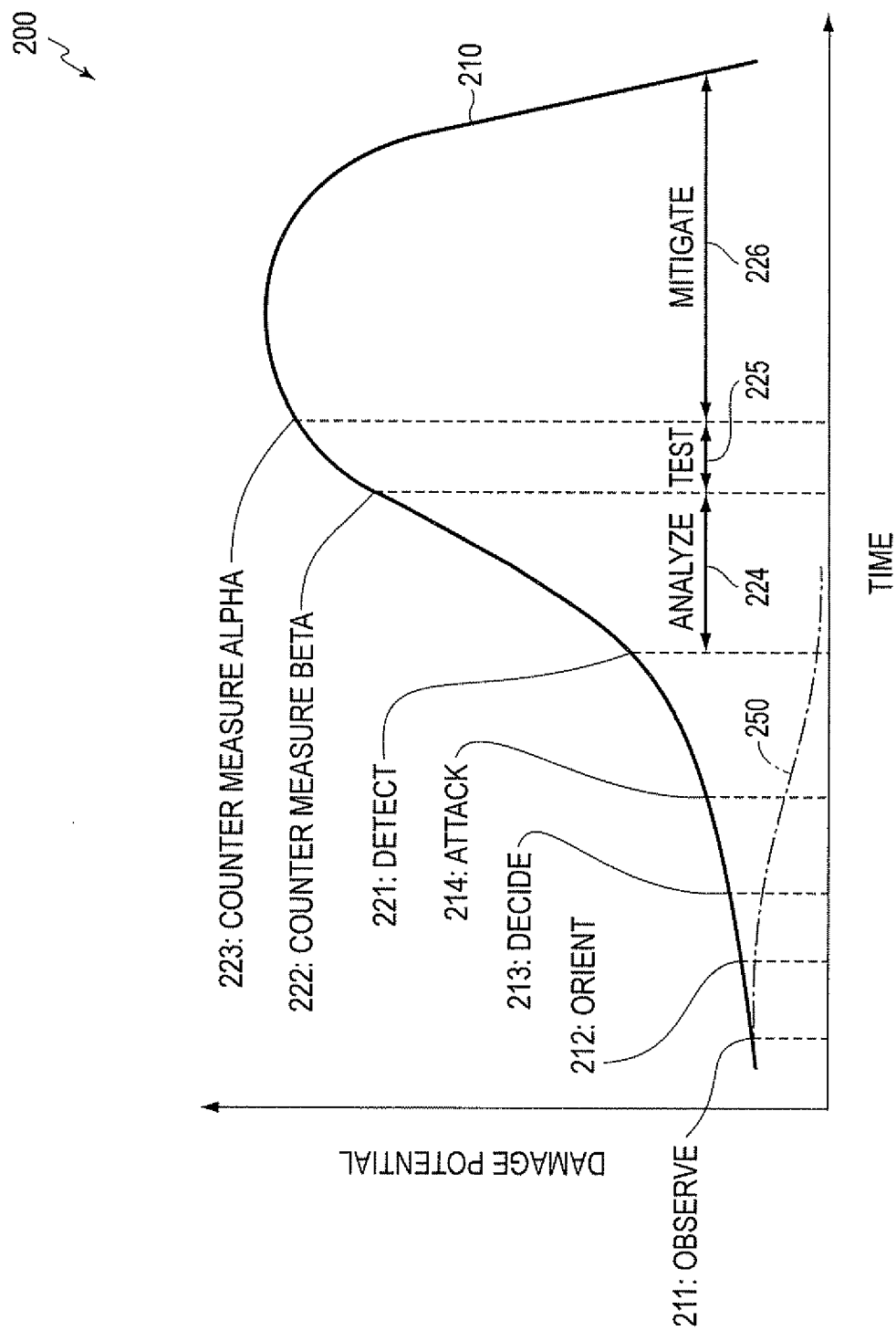
FIG. 2 shows a plot 200 comparing network intrusion damage potential to a net liar enabled device and a comparison device according to an embodiment of the disclosure.

FIG. 2 shows a plot 200 comparing network intrusion damage potential to a net liar enabled device and a comparison device according to an embodiment of the disclosure. The plot 200 includes a first damage curve 210 for the comparison device, and a second damage curve 250 for the net liar enabled device.

For the comparison device, the network intrusion damage potential is a function of attacker actions and comparison device actions during a network intrusion and mitigation process. During a network intrusion and mitigation process, for example, an attacker takes various actions to induce damage potential, such as observe action 211, orient action 212, decide action 213, attack action 214, and the like, and the comparison device also takes various actions to mitigate the damage potential, such as detect action 221, a counter measure beta 222 and a counter measure alpha 223. Because the comparison device reacts after an attack occurs, the network intrusion damage potential is relatively large.

Specifically, the attacker takes the observe action 211 to start a network intrusion. For example, the attacker uses a brute force approach or a deterministic approach to obtain enumeration data of the comparison device. In an example, the attacker sequentially scans ports of the comparison device to enumerate port status of the comparison device. Thus, the comparison device starts to have network intrusion damage potential.

Further, the attacker takes the orient action 212 to analyze software/hardware fingerprints of the comparison device based on the enumeration data. Thus, the comparison device has an increased potential to be a network intrusion target. For example, the attacker checks the port enumeration data, and finds that port 139 is open. Generally, a Windows operating system or a Linux operating system that replicates Windows services uses port 139. The attacker determines that the operating system is either Windows or Linux, and further investigates to find additional fingerprints of the operating system.

Subsequently, the attacker takes the decide action 213 to determine weakness of the comparison device based on the software/hardware fingerprints. Thus, the comparison device has increased network intrusion damage potential.

Then, the attacker takes the attack action 216. When the attacker finds that the attack works, the attacker can continuously attack the comparison device, and thus the network intrusion damage potential to the comparison device increases sharply with time. For example, when the attacker starts downloading confidential data from the comparison device, the network intrusion damage potential increases significantly with time.

The comparison device may take the detect action 221 after significant damage potential has been caused to the comparison device. Then, the comparison device takes an analyzing time duration 224 to study the attack, and takes a quick fix, such as the counter measure beta 222 to find strategies to mitigate the network intrusion damage potential. In the FIG. 2 example, the comparison device takes a test time 225 to test the counter measure beta 222, and improves mitigation performance. During the test time 225, the network intrusion damage potential can still increase with time before the right strategy is found and executed.

When the comparison device finds the right strategy and applies the right strategy, as seen by the counter measure alpha 223, the network intrusion damage potential starts to decrease with time, as seen by time during 226 for mitigating. It is noted that the right strategy may need to be applied to all the nodes in the sub-network with the comparison device in order to mitigate the damage potential.

For the net liar enabled device, the attacker can still take the observe action 211 to scan the net liar enabled device to obtain enumeration data. However, the net liar enabled device provides to the attacker disinformation in response to the attacker scan. The disinformation hides the real information of the net liar enabled device from the attacker without letting the attacker to suspect. The attacker then attacks based on the disinformation, fails the attack. Thus, the network intrusion damage potential is relatively low.

In an example, the attacker scans ports of the net liar enabled device to enumerate port status. In response to the scan, the net liar enabled device provides disinformation. For example, the net liar enabled device uses a Linux operating system that does not use port 139. However, the net liar enabled device suitably provides disinformation, such as using packet injection, deceptive TCP/IP fingerprint, and the like, to indicate an open status for port 139 when the attacker probes port 139. In addition, the net liar enabled device provides other suitable disinformation that purposely misguides the attacker to believe that the net liar enabled device uses a Windows operating system. Further, the attacker may try to exploit the net liar enabled device using weakness of the Windows operating system. In an example, the attacker exploits port 139 for NETBIOS. Because the real status for port 139 is close, the NETBIOS exploit fails. Thus, the network intrusion damage potential to the net liar enabled device keeps relatively low. Further, when attacks to the net liar enabled device keep failing, the attacker may stop attacking the net liar enabled device. In addition, the attacker can be identified, for example, based on the attacks and the disinformation fed to the non-trusted entities. The identified attacker can be reported to suitable authority to stop the attacker.

Figure 3:
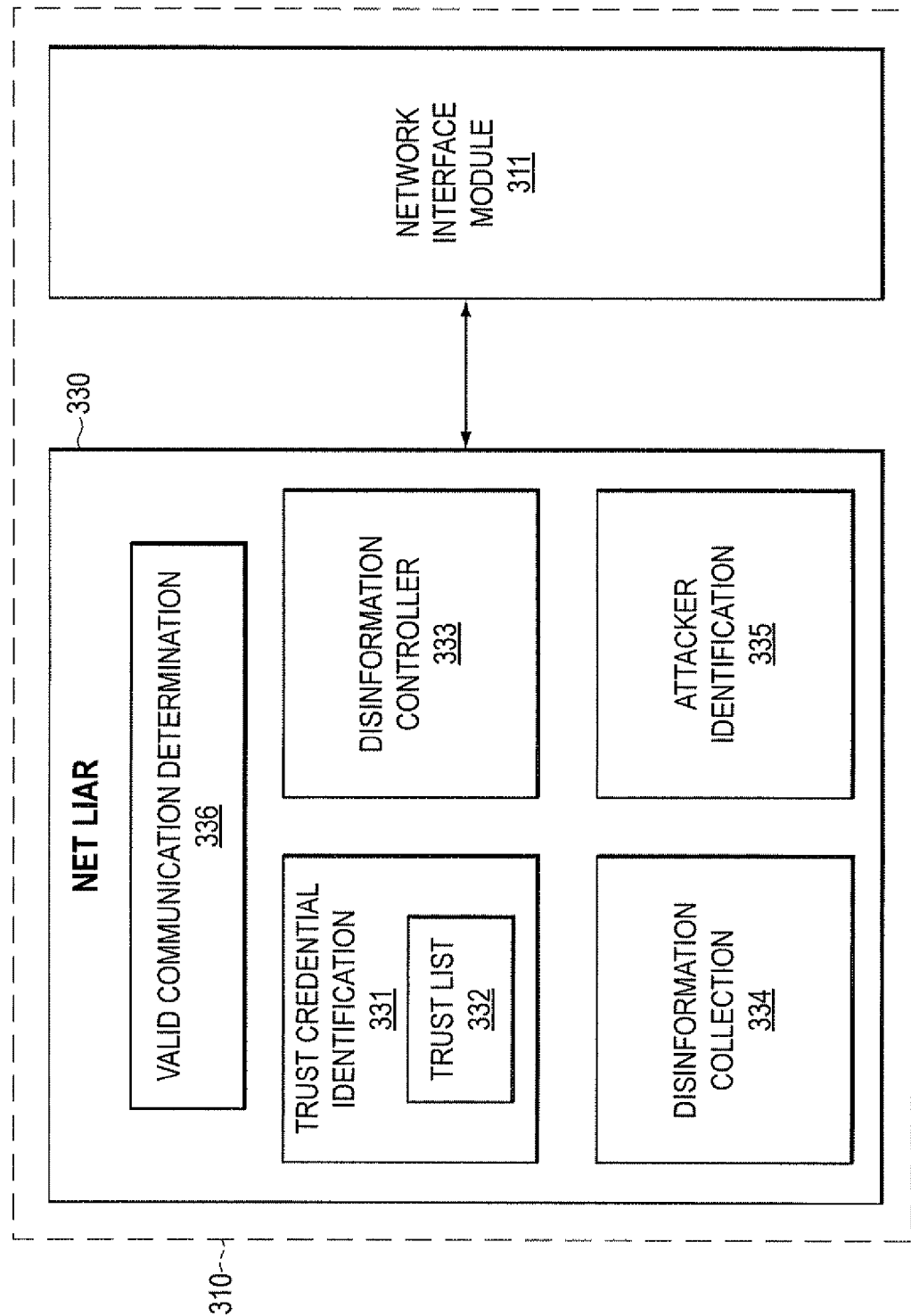
FIG. 3 shows a block diagram of a net liar enabled device example 310 according to an embodiment of the disclosure.

FIG. 3 shows a block diagram of a net liar enabled device example 310 according to an embodiment of the disclosure.

The net liar enabled device 310 includes a network interface module 311, and a net liar module 330 coupled together as shown in FIG. 3.

The network interface module 311 includes any suitable components to enable the net liar enabled device 310 to communicate to other devices. In an example, the network interface module 311 includes a receiving portion (not shown) and a transmitting portion (not shown). The receiving portion is configured to receive signals from the other devices, and the transmitting portion is configured to transmit signals to the other devices.

The net liar module 330 includes a trust determination module, such as a trust credential identification module 331, a valid communication determination module 336, and the like, to determine whether an entity that communicates with the net lair enabled device 310 is trusted or non-trusted. Further, the net liar module 330 includes a disinformation controller module 333, a disinformation collection module 334, and an attacker identification module 335.

The trust credential identification module 331 identifies a trust credential of an entity that communicates with the net liar enabled device 310, and determines whether the entity has enough trust credential to receive real information of the net liar enabled device 310. In an example, an entity initiates a communication connection with the net liar enabled device 210 by a handshake process. During the handshake process, the net liar enabled device 310 receives one or more identifications of the entity, such as an IP address, a media access control (MAC) address, and the like. The trust credential identification module 331 identifies the entity as a trusted entity or a non-trusted entity based on the identifications.

In an example, the trust credential identification module 331 includes a trust list 332 listing a combination of IP addresses and MAC addresses of trusted entities that have enough trust credentials. The trust credential identification module 331 searches the trust list 332 for a combination of IP address and MAC address of the entity that initiates the communication connection with the net liar enabled device 310. When the combination of IP address and MAC address of the entity is on the trust list 332, the entity is trusted; when the combination of IP address and MAC address of the entity is not on the trust list 332, the entity is non-trusted.

It is noted that the trust credential module 331 can use any other suitable method to identify the trust credential of an entity.

The valid communication determination module 330 determines whether a communication from an entity is valid. In an example, when the net liar enabled device 310 receives an initial communication, such as a packet, indicating that an entity wants to set up a connection with the net liar enabled device 310, the valid communication determination module 330 checks the packet for signs of invalid communication. For example, the valid communication determination module 330 checks flags in the packet that are normally turned off. When a flag is suspiciously turned on, for example, the valid communication determination module determines that the communication is invalid.

The disinformation controller module 333 controls the disinformation provided to a non-trusted entity for hiding the real information of the net liar enabled device 310. The disinformation controller module 333 can control the disinformation from various aspects. In an example, the disinformation controller module 333 controls what kind of disinformation, such as port disinformation, TCP/IP disinformation, and the like. In another example, the disinformation controller module 333 controls a time window for using the disinformation. In another example, the disinformation controller module 333 controls the source of the disinformation, such as from the present node, or from a net liar management node.

In an example, the disinformation controller module 333 determines to hide a Linux operating system used by the net liar enabled device 310. Further, the disinformation controller module 333 determines to use a Windows operating system to hide the Linux operating system. Then, the disinformation controller module 333 determines a one-year time window for using the Windows operating system to hide the Linux operating system.

The disinformation collection module 334 records entities that are fed with disinformation, and keeps track of the disinformation fed to the entities. In an example, the disinformation collection module 334 stores the non-trusted entities in association with the disinformation fed to the non-trusted entities.

The attacker identification module 335 correlates an attack with a non-trusted entity based on the disinformation fed to the non-trusted entity. In an example, when the net liar enabled device 310 receives an attack that exploits port 139 for NETBIOS, the attacker identification module 335 identifies the non-trusted entities that have been fed with a Windows operating system as suspects.

During operation, for example, the network interface module 311 receives a handshake signal from an entity. The handshake signal includes, for example, an IP address and a MAC address of the entity. The trust credential identification module 331 searches the trust list 332 for a combination of the IP address and the MAC address of the entity. When the combination of the IP address and the MAC address is on the trust list 332, the entity is trusted; when the combination of the IP address and the MAC address is not on the trust list 332, the entity is non-trusted. In another example, the valid communication determination module 336 checks the handshake signal to determine whether the communication from the entity is valid. When the valid communication determination module 336 determines that the communication is invalid, the entity is non-trusted.

When the entity is non-trusted, the disinformation controller module 333 controls the disinformation provided to the entity for hiding the real information of the net liar enabled device 310. In an example, the disinformation controller module 333 determines to use a Windows operating system to hide a Linux operating system used by the net liar enabled device 310, and controls the network interface module 311 to respond to scans from the non-trusted entity accordingly. For example, the network interface module 311 responds to a scan of port 139 with an open status when the real status of port 139 is close.

Further, the disinformation collection module 334 records the non-trusted entity in association with the disinformation fed to the non-trusted entity. For example, the disinformation collection module 334 records the non-trusted entity in association with Windows operating system.

Later, when the net liar enabled device 310 receives an attack that exploits port 139 for NETBIOS, the attacker identification module 335 correlates the attack with the non-trusted entity that has been fed with the disinformation of the Windows operating system.

It is noted that the net liar module 330 can be implemented by various techniques, such as software, hardware, or a combination of software and hardware. In an example, the net liar module 330 is implemented as program instructions that can be stored on a computer readable memory medium. The program instructions can be executed by a processor to perform the above described functions.

Figure 4A:
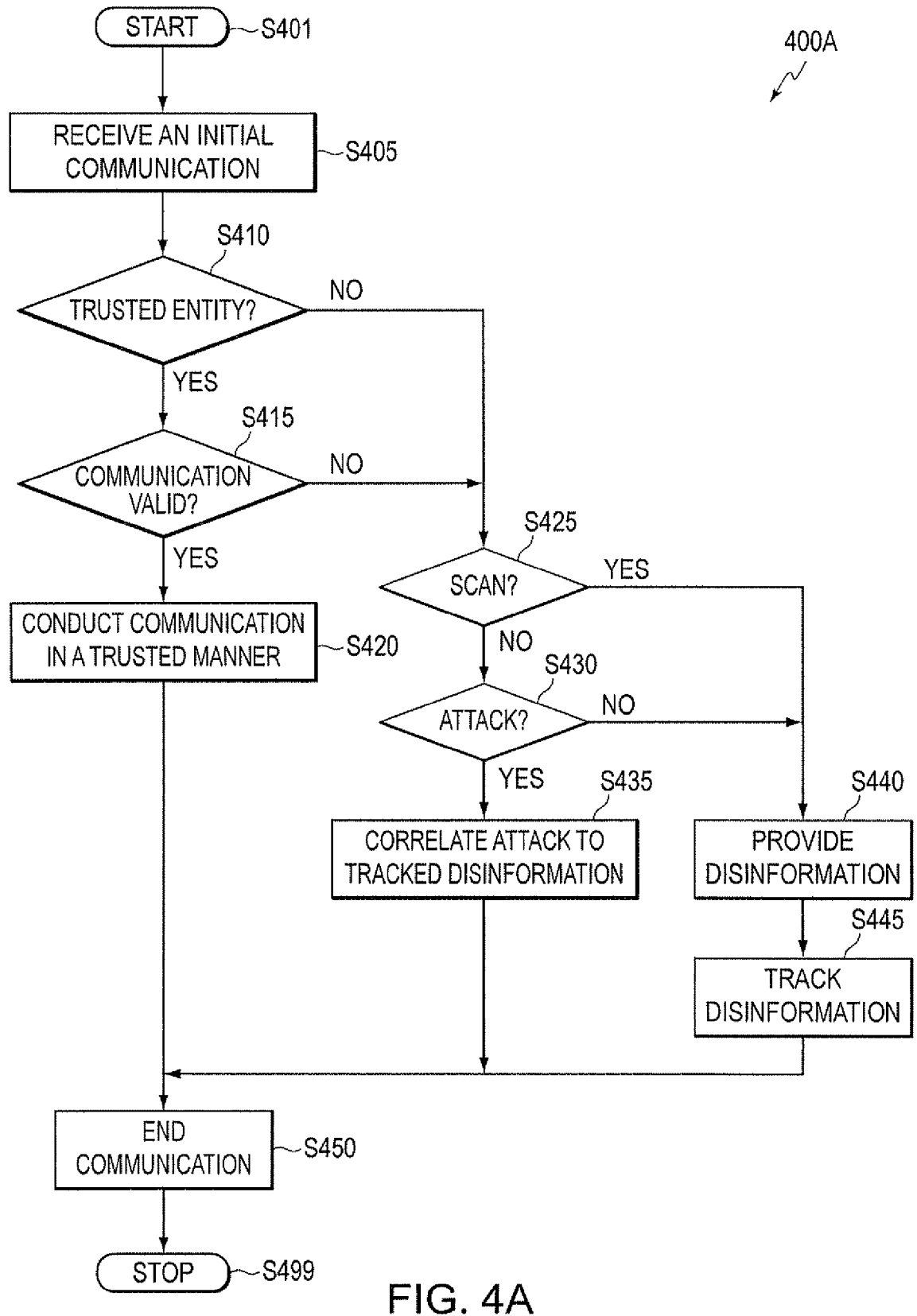
FIGS. 4A-4C show flow charts outlining processes 400A-400C for a net liar enabled device to prevent network intrusion according to an embodiment of the disclosure.

FIG. 4A shows a flow chart outlining a process 400A for a net liar enabled device to prevent network intrusion according to an embodiment of the disclosure. The process starts at S401, and proceeds to S405.

At S405, the net liar enabled device receives an initial communication, such as an initial packet for handshaking.

At S410, the net liar enabled device determines whether the initial communication is from a trusted entity. For example, the net liar enabled device obtains one or more identifications of the entity, such as an IP address, a MAC address, and the like. Then, the net liar enabled device determines whether the entity has enough trust credential for receiving real information of the net liar enabled device. In an embodiment, the net liar enabled device includes a trust list that stores combinations of IP addresses and MAC addresses of trusted entities. The net liar enabled device checks whether a combination of the IP address and the MAC address of the entity is on the trust list. When the entity has enough trust credential, for example, the combination of the IP address and the MAC address is on the trust list, the process proceeds to S415; otherwise, the process proceeds to S425.

At S415, the net liar enabled device determines whether the initial communication is valid. For example, the net liar enabled device checks flags in the initial communication for signs that point to invalid communication. When the initial communication is valid, the process proceeds to S420; otherwise, the process proceeds to S425.

At S420, the net liar enabled device conduct communication with the entity in a trusted manner.

At S425, the net liar enabled device determines whether the initial communication corresponds to scan. When the initial communication corresponds to scan, the process proceeds to S440; otherwise the process proceeds to S430.

At S430, the net liar enabled device determines whether the initial communication corresponds to an attack. When the net liar enabled device detects an attack, the process proceeds to 435; otherwise, the process proceeds to S440.

At S435, the net liar enabled device correlates the attack to tracked disinformation.

At S440, the net liar enabled device provides disinformation in response to the initial communication and/or further communication from the entity. In an example, the net liar enabled device uses a Linux operating system, but applies any suitably technique to have port 139 appeared open in order to misguide the entity to believe that the net liar enabled device uses a Windows operating system.

At S445, the net liar enabled device tracks the entity with the disinformation fed to the entity. In an example, the net liar enabled device records the entity in association with the Windows operating system.

At S450, the communication ends, and the process proceeds to S499 and terminates.

Figure 4B:
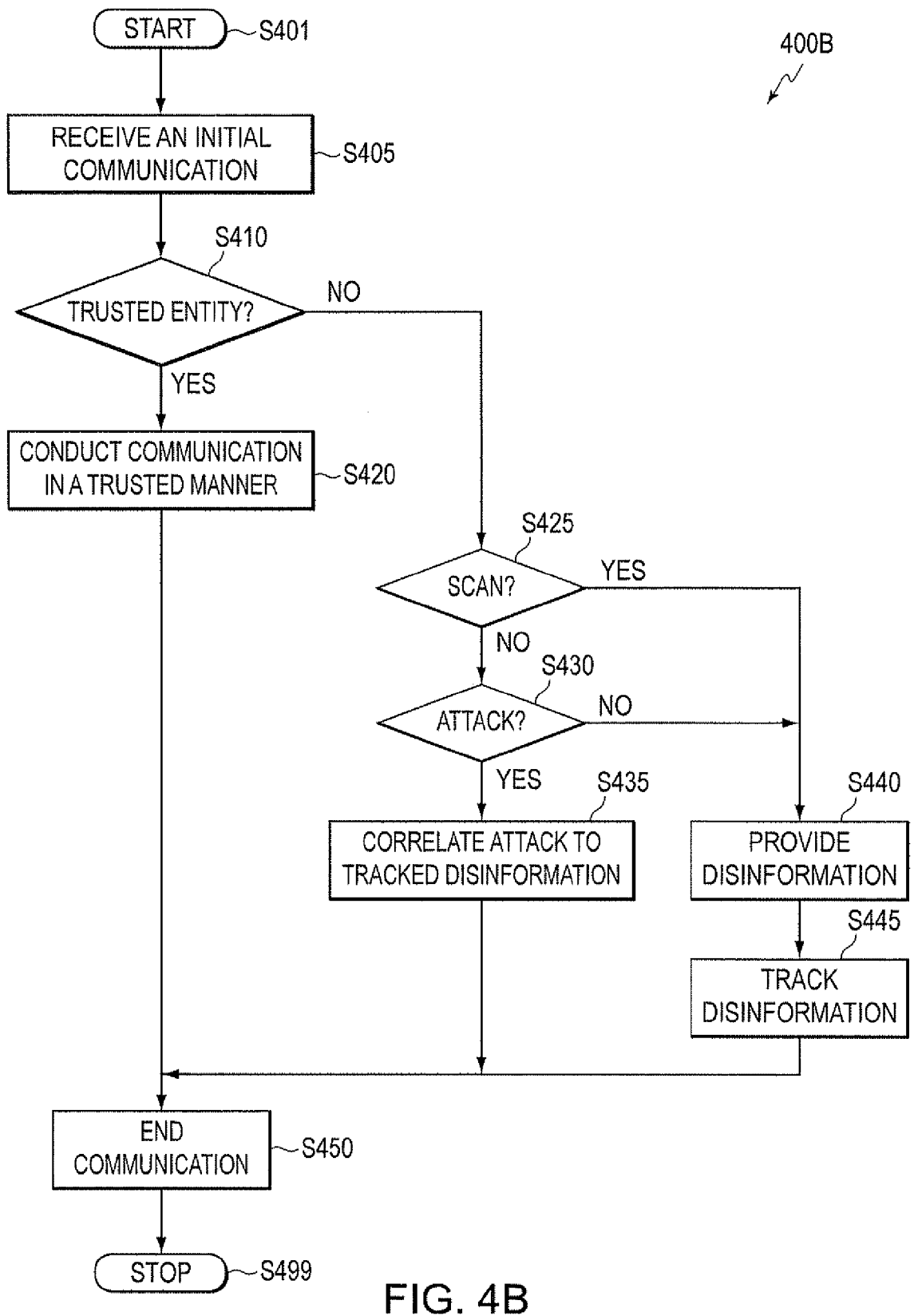
Figure 4C:
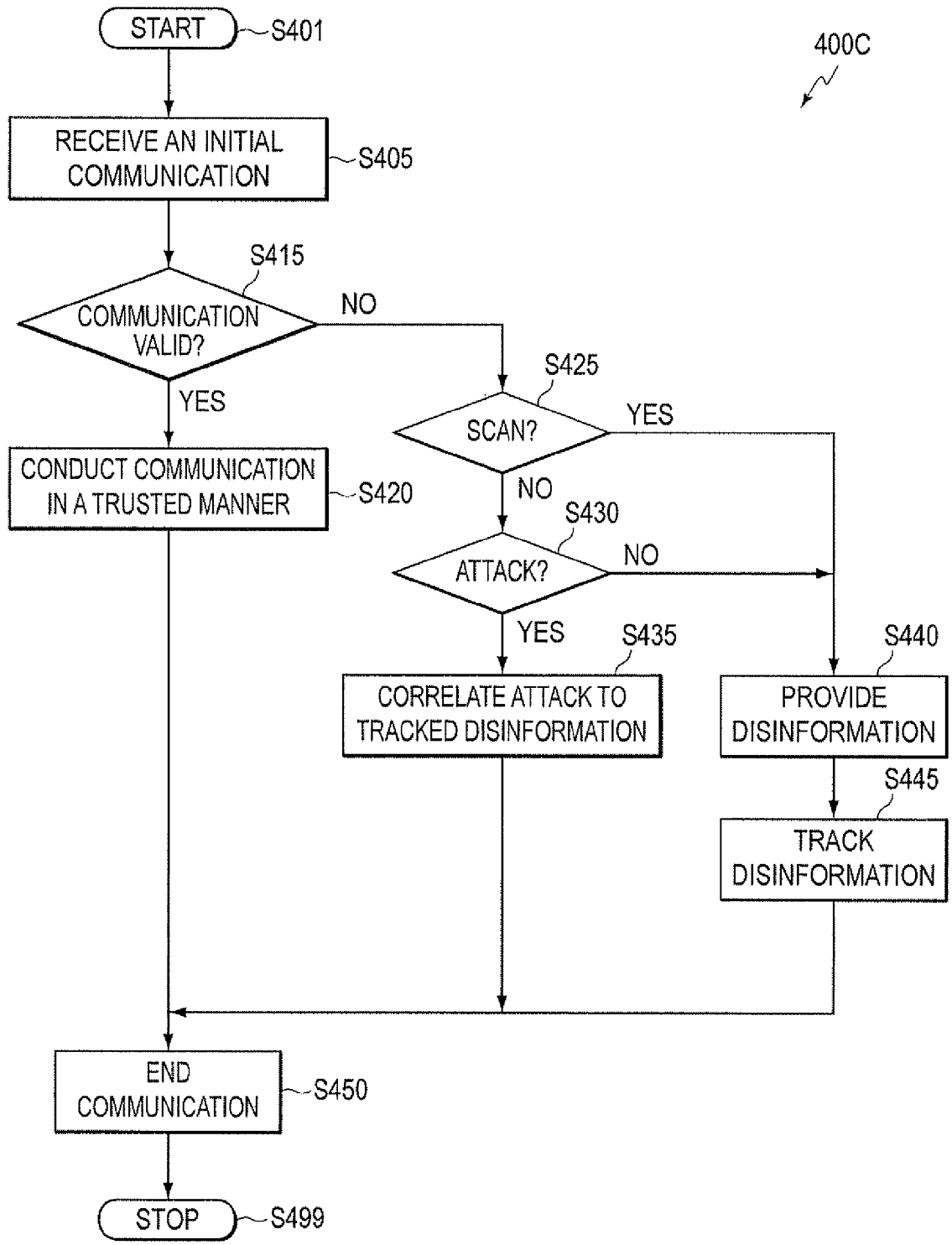

It is noted that the process 400A can be suitably modified. For example, one of S410 and S415 can be removed. FIG. 4B shows a flow chart outlining a process 400B that is modified from the process 400A by removing S415, and FIG. 4C shows a flow chart outlining a process 400C that is modified from the process 400A by removing S410.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A method of preventing network intrusion to a network, comprising:
    receiving by a network device an initial communication from an entity;
    determining the entity is not trusted based on the initial communication, wherein said determining can be based on (i) the entity missing from a trust list or (ii) discovering a flag of a packet turned on which is normally turned off, the packet being included in the initial communication; and
    transmitting a first disinformation in place of a real information of the network device to misguide the by one of a plurality of net liar modules, each net liar module operating independently in a sub-network of the network, wherein the first disinformation is made congruent over the sub-network by a net liar management module configured to manage the plurality of net liar modules such that the first disinformation and any other disinformation transmitted by another of the net liar modules do not contradict each other; and
    transmitting signals that are indicative of the first disinformation to hide the real information of the network device in a consistent manner within a first time window.

2. The method of claim 1, further comprising:
    transmitting signals that are indicative of second disinformation to hide the real information of the network device within a second time window.

3. The method of claim 1, further comprising:
    receiving a control signal from a management device that manages disinformation of a sub-network that includes the network device, the control signal being indicative of the first disinformation.

4. The method of claim 1, wherein determining the entity is not trusted based on the initial communication further comprises at least one of:
    determining the entity is not trusted when a trust credential of the entity does not satisfy a trust condition; and
    determining the entity is not trusted when the initial communication is invalid.

5. The method of claim 4, wherein determining the entity is not trusted when the trust credential of the entity does not satisfy the trust condition further comprises:
    looking-up the entity on the trust list.

6. The method of claim 1, further comprising:
    correlating an attack to the entity when the attack targets the network device based on the first disinformation.

7. The method of claim 1, wherein transmitting the signals to the entity that are indicative of the first disinformation of the network device to hide the real information of the network device further comprises:
    indicating a status of a port that is opposite to a real status of the port.

8. A network device for preventing network intrusion to a network, the network device comprising:
    a network interface module configured to receive signals from entities and transmit signals to the entities;
    a plurality of net liar modules, each net liar module operating independently in a sub-network of the network, each net liar module that comprises:
        a trust determination module configured to determine that an entity is not trusted based on an initial communication from the entity, wherein said determination can be based on (i) the entity missing from a trust list or (ii) discovering a flag of a packet turned on which is normally turned off, the packet being included in the initial communication; and a disinformation controller module configured to control the network interface module to transmit a first disinformation in place of a real information of the network device to misguide the entity and control the network interface module to transmit signals that are indicative of the first disinformation in a consistent manner within a first time window; and a net liar management module configured to manage the plurality of net liar modules and made the first disinformation congruent over the sub-network such that the first disinformation and any other disinformation transmitted by another of the net liar modules do not contradict each other.

9. The network device of claim 8, further comprising:
a disinformation controller module configured to control the network interface module to transmit signals that are indicative of second disinformation within a second time window.

10. The network device of claim 8, wherein:
the disinformation controller module is configured to receive a control signal from a management module that manages disinformation of a sub-network that includes the network device, the control signal being indicative of the first disinformation of the network device.

11. The network device of claim 8, wherein the net liar module further comprises:
an attacker identification module configured to correlate an attack to the entity when the attack targets the network device based on the first disinformation.

12. The network device of claim 8, wherein the disinformation controller module is configured to control the network interface module to indicate a status of a port that is opposite to a real status of the port.

13. A non-transitory computer readable medium storing program instructions for causing a processor to execute operations for preventing network intrusion to a network, the operations comprising:
receiving by a network device an initial communication from an entity;
determining the entity is not trusted based on the initial communication, wherein said determining can be based on (i) the entity missing from a trust list or (ii) discovering a flag of a packet turned on which is normally turned off, the packet being included in the initial communication;
transmitting a first disinformation in place of a real information of the network device to misguide the entity by one of a plurality of net liar modules, each net liar module operating independently in a sub-network of the network, wherein the first disinformation is made congruent over the sub-network by a net liar management module configured to manage the plurality of net liar modules such that the first disinformation and any other disinformation transmitted by another of the net liar modules do not contradict each other; and
transmitting signals that are indicative of the first disinformation to hide the real information of the network device in a consistent manner within a first time window.

14. The non-transitory computer readable medium of claim 13, the operations further comprising:
transmitting signals that are indicative of second disinformation to hide the real information of the network device within a second time window.

15. The non-transitory computer readable medium of claim 13, the operations further comprising:
receiving a control signal from a management module that manages disinformation of a sub-network that includes the network device, the control signal being indicative of the first disinformation of the network device.

16. The non-transitory computer readable medium of claim 13, wherein determining the entity is not trusted based on the initial communication further comprises at least one of:
determining the entity is not trusted when a trust credential of the entity does not satisfy a trust condition; and
determining the entity is not trusted when the initial communication is invalid.

17. The non-transitory computer readable medium of claim 13, the operations further comprising:
correlating an attack to the entity when the attack targets the network device based on the first disinformation.

18. The non-transitory computer readable medium of claim 13, wherein transmitting the signals to the entity that are indicative of the first disinformation of the network device to hide the real information of the network device further comprises:
indicating a status of a port that is opposite to a real status of the port.

\* \* \* \* \*